US00RE48160E

(19) United States
(12) Reissued Patent
Liu et al.

(10) Patent Number: US RE48,160 E
(45) Date of Reissued Patent: Aug. 11, 2020

(54) METHOD AND SYSTEM FOR POSITIONING WIRELESS DEVICE

(71) Applicant: MARVELL WORLD TRADE LTD., St. Michael (BB)

(72) Inventors: BoChih Liu, Shanghai (CN); Zhike Jia, Fremont, CA (US); Jing Yu, Shanghai (CN); Jian Chen, Shanghai (CN); Yuan Ren, Shanghai (CN); Xing Zhao, Beijing Shi (CN)

(73) Assignee: MARVELL ASIA PTE, LTD., Singapore (SG)

(21) Appl. No.: 15/947,449

(22) Filed: Apr. 6, 2018

Related U.S. Patent Documents

Reissue of:
(64) Patent No.: 9,197,998
Issued: Nov. 24, 2015
Appl. No.: 14/260,849
Filed: Apr. 24, 2014

U.S. Applications:
(60) Provisional application No. 61/865,751, filed on Aug. 14, 2013, provisional application No. 61/824,182, filed on May 16, 2013.

(51) Int. Cl.
*H04W 24/00* (2009.01)
*H04W 4/02* (2018.01)
(Continued)

(52) U.S. Cl.
CPC ..... *H04W 4/023* (2013.01); *G01S 5/0252* (2013.01); *H04W 64/00* (2013.01)

(58) Field of Classification Search
CPC ..... H04W 4/023; H04W 64/00; G01S 5/0252
See application file for complete search history.

(56) References Cited

U.S. PATENT DOCUMENTS 7,313,403 B2 * 12/2007 Gong ..... G01S 3/28 455/404.2
7,346,359 B2 * 3/2008 Damarla ..... G01S 5/0252 455/404.2
(Continued)

FOREIGN PATENT DOCUMENTS

CN 101572856 A 11/2009
CN 101572857 A 11/2009
(Continued)

OTHER PUBLICATIONS

Combined Chinese Office Action and Search Report dated Apr. 4, 2018 in Patent Application No. 201410215898.4 (with English language translation and translation of categories of cited documents).
(Continued)

*Primary Examiner* — Colin M LaRose

(57) ABSTRACT

Aspects of the disclosure provide a method. The method includes storing a database of positioning data. Each positioning data can associate position information of a location with an identifier of a wireless station for providing wireless connection at the location and a characteristic of a wireless signal received at the location. Further, the method includes receiving a position request from a wireless device that receives an identifier and a specific characteristic of a wireless signal from a specific wireless station, identifying the specific wireless station using the identifier to retrieve a group of positioning data from a database, selecting a subset in the group of positioning data using the specific characteristic, and determining position information of the wireless device using the selected subset of positioning data.

19 Claims, 4 Drawing Sheets

(51) Int. Cl.
*G01S 5/02* (2010.01)
*H04W 64/00* (2009.01)

(56) References Cited

U.S. PATENT DOCUMENTS 7,433,693 B2 * 10/2008 Sheynblat ..... 455/456.1
8,180,367 B2 * 5/2012 Gilad ..... H04W 64/00 370/331
8,200,251 B2 * 6/2012 Huang ..... H04W 64/003 455/457
8,423,043 B2 * 4/2013 Kazmi ..... G01S 5/0252 455/456.1
8,554,249 B2 * 10/2013 Britt, Jr. ..... H04W 64/00 342/450
8,934,921 B2 * 1/2015 Marti et al. ..... 455/456.2
9,763,034 B2 9/2017 Denis et al.
2011/0171912 A1 * 7/2011 Beck et al. ..... 455/67.11
2011/0269479 A1 * 11/2011 Ledlie ..... 455/456.1
2014/0171114 A1 * 6/2014 Marti ..... G01C 21/10 455/456.2
2014/0280881 A1 * 9/2014 Szamonek et al. ..... 709/224

FOREIGN PATENT DOCUMENTS

CN 103068035 A 4/2013
KR 10-2011-0026229 A 3/2011

OTHER PUBLICATIONS

Chinese Office Action dated Sep. 20, 2018 in corresponding Chinese Patent Application No. 201410215898.4, 7 pages.
"GPS Position Accuracy Measures", NovAtel, 2003, 6 pages.
Chinese Office Action dated Apr. 12, 2019 in corresponding Chinese Patent Application No. 201410215898.4, (with English translation) 8 pages.

* cited by examiner

330

332 336

| LOCATION (LATITUDE, LONGITUDE) (GPS) | WIRELESS FINGERPRINTS (WIRELESS STATION ID, RSSI) |
|---|---|
| LOCATION 1 (LAT-1, LON-1) | (WS-A, 50) |
| LOCATION 2 (LAT-2, LON-2) | (WS-A, 90) |
| LOCATION 3 (LAT-3, LON-3) | (WS-A, 40) (WS-B, 20) |
| LOCATION 4 (LAT-4, LON-4) | (WS-A, 20) (WS-B, 35) |
| LOCATION 5 (LAT-5, LON-5) | (WS-B, 80) |
| LOCATION 6 (LAT-6, LON-6) | (WS-B, 90) |
| LOCATION 7 (LAT-7, LON-7) | (WS-B, 85) |
| LOCATION 8 (LAT-8, LON-8) | (WS-B, 60) |
| LOCATION 9 (LAT-9, LON-9) | (WS-B, 20) (WS-C, 30) |
| LOCATION 10 (LAT-10, LON-10) | (WS-C, 50) |

FIG. 3

METHOD AND SYSTEM FOR POSITIONING WIRELESS DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

INCORPORATION BY REFERENCE

[This present disclosure] *This application is a reissue application of U.S. Pat. No. 9,197,998, issued on Nov. 24, 2015, which* claims the benefit of U.S. Provisional Application No. 61/824,182, "Mobile Device Positioning Method and System for Hybrid Wireless Networks" filed on May 16, 2013, and U.S. Provisional Application No. 61/865,751, "Position Data Distribution Applied to Server Assisted Positioning System" filed on Aug. 14, 2013, which are incorporated herein by reference in their entirety.

FIELD

This disclosure relates generally to position determination. More specifically, the disclosure relates to methods and apparatus for performing database based position determination for wireless devices in wireless communication networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A modern wireless device can incorporate functions of a satellite positioning system receiver, of a cellular transceiver, or of a wireless transceiver. When a wireless device functions as a satellite positioning system receiver, the wireless device can specify a device's position by use of only signals from satellites. Satellite based positioning can provide high accuracy, but require a positive line of sight between satellites and the wireless device. Further, receiving and processing satellite positioning signals may consume substantial energy and hence shorten battery duration.

A device can communicate wirelessly with a wireless communication network by employing radio frequency (RF) field propagation. The radio frequency, a frequency within the electromagnetic spectrum associated with radio wave propagation, is supplied to an antenna that creates an electromagnetic field that propagates through space. A component of a wireless communication network can be a wireless station, for example, a cellular base station of a cellular network, or an access point of a wireless local area network (LAN) or a wireless personal area network (PAN). The wireless station can allow a wireless device to communicate with a wired network through an access gateway. Typically, the wireless station broadcasts a beacon signal providing key information necessary for wireless devices to connect to it. A wireless station can serve wireless devices located in a geographic area. When a wireless device functions as a cellular transceiver and/or a wireless transceiver, the wireless device can determine its position using the locations of the wireless stations to which the wireless device can communicate, by triangulating its position based on the strength of the signals received from the wireless stations, if the locations of the wireless stations are known.

As an alternative to triangulation based positioning, database based positioning can be used to determine a position of a wireless device by evaluation of the RF measurements. These measurements are compared to the entries of the database. The corresponding calculations find the best matching database entry and thus lead to a position estimate. Database based positioning can provide high degree of accuracy and is utilized for network-based positioning system. This method does not rely on line of sight conditions but benefits from the more distinct radio patterns of multipath environments. Only network inherent parameters are utilized so that no hardware modifications are required and legacy devices can be employed.

SUMMARY

Aspects of the disclosure provide a method. The method includes storing a database of positioning data. Each positioning data can associate position information of a location with an identifier of a wireless station for providing wireless connection at the location and a characteristic of a wireless signal received at the location. Further, the method includes receiving a position request from a wireless device that receives an identifier and a specific characteristic of a wireless signal from a specific wireless station, identifying the specific wireless station using the identifier to retrieve a group of positioning data from a database, selecting a subset in the group of positioning data using the specific characteristic, and determining position information of the wireless device using the selected subset of positioning data.

According to an aspect of the disclosure, the method includes selecting the subset in the group of positioning data based on the specific characteristic. In an embodiment, the method comprises selecting a subset if the specific characteristic is inside the boundaries of a group of positioning data. The subset can be selected when the specific characteristic is inside the boundaries of a subset. In another embodiment, the method comprises determining a subset if the specific characteristic is outside the boundaries of a group of positioning data. The subset can be determined based on calculating the closeness between the specific characteristic and the characteristics in the group of positioning data.

According to an aspect of the disclosure, the method includes determining position information of the wireless device based on the selected subset of positioning data. In an embodiment, the method comprises determining position information of the wireless device based on weigh-averaging position information in the selected subset of the positioning data if the specific characteristic is inside the boundaries of a group of positioning data. In another embodiment, the method comprises determining position information of the wireless device based on averaging positioning information in the selected subset of the positioning data if the specific characteristic is outside the boundaries of a group of positioning data.

Aspects of the disclosure provide an apparatus that includes a storage medium and a processor. The storage medium is configured to store a database of positioning data. Each positioning data can associate position information of a location with an identifier of a wireless station for providing wireless connection at the location and a characteristic of a wireless signal received at the location. The processor is configured to receive a position request from a wireless device that receives an identifier and a specific characteristic of a wireless signal from a specific wireless station, identify the specific wireless station using the identifier to retrieve a group of positioning data from a database, select a subset in the group of positioning data using the specific characteristic, and determine position information of the wireless device using the selected subset of positioning data.

Aspects of the disclosure provide another method. The method includes providing a database of positioning data, each positioning data associating position information of a location with an identifier of a wireless station for providing wireless connection at the location and a characteristic of a wireless signal received at the location, receiving a position request from a wireless device that receives n identifiers and n characteristics of wireless signals from n wireless stations (n is a positive integer), identifying n wireless stations using the n identifiers to retrieve n groups of positioning data from a database, selecting n subsets in the n groups of positioning data using the n characteristics, calculating n locations using the n selected subsets of positioning data, excluding outliers from a set of the n locations when outliers whose distances to the average location exceed a threshold, and determining position information of the wireless device based on averaging the n locations at the most.

According to an aspect of the disclosure, the method includes selecting, for each identified wireless station, when the characteristic is inside the boundaries of a group of positioning data, a subset when the characteristic is inside the boundaries of the subset, and determining the subset when the received characteristic is outside the boundaries of the group of positioning data.

According to an aspect of the disclosure, for each identified wireless station, the method includes weigh-averaging position information in the selected subset of positioning data when the received characteristic is inside the boundaries of a group of positioning data, and averaging position information in the selected subset of positioning data when the received characteristic is outside the boundaries of a group of positioning data.

According to an aspect of the disclosure, to exclude outliers from a set of the n locations, the method includes determining the average location based on averaging a set of the n locations, and determining the threshold value based on a threshold percentage of sets of the n locations to be included.

Aspects of the disclosure provide another method. The method includes defining a plurality of subsets for a group of positioning data, each subset including clustering boundaries, calculating a value of cumulative distribution function for each subset using population distribution in each subset, resetting clustering boundaries of a subset when a value of cumulative distribution function reaches over a threshold, and updating clustering boundaries of a subset in wireless station information table.

According to an aspect of the disclosure, to reset clustering boundaries of a subset, the method includes resetting a value of cumulative distribution function for a subset to determine clustering boundaries of a subset.

Aspects of the disclosure provide another apparatus. The apparatus includes a storage medium and a processor. The storage medium is configured to provide a database of positioning data. Each positioning data associates position information of a location with an identification of a wireless station device for providing wireless connection at the location and a characteristic of a wireless signal received at the location. The processor is configured to receive a position request from a wireless device that receives n identifiers and n characteristics of wireless signals from n wireless stations, identify the n wireless stations using the n identifiers to retrieve the n groups of positioning data from a database, select the n subsets in the n groups of positioning data using the n characteristics, calculate the n locations using the n selected subsets of positioning data, exclude outliers from a set of the n locations when outliers whose distances to the average location exceed a threshold, and determine the position information of the wireless device based on averaging the n locations at the most.

Aspects of the disclosure provide another apparatus that includes a processor. The processor is configured to define a plurality of subsets for a group of positioning data, each subset including clustering boundaries, calculate a value of cumulative distribution function for each subset using population distribution in each subset, reset clustering boundaries of a subset when the value of cumulative distribution function reaches over a threshold, and update clustering boundaries of a subset in a wireless station information table.

According to an aspect of the disclosure, to reset the clustering boundaries of the subset when the requirement is satisfied, the processor is configured to reset a value of cumulative distribution function for a subset to determine clustering boundaries of a subset.

BRIEF DESCRIPTION OF THE DRAWINGS

Various embodiments of this disclosure that are proposed as examples will be described in detail with reference to the following figures, wherein like numerals reference like elements, and wherein:

FIG. 3 shows an example for positioning data according to an embodiment of the disclosure.

DETAILED DESCRIPTION OF EMBODIMENTS

Figure 1:
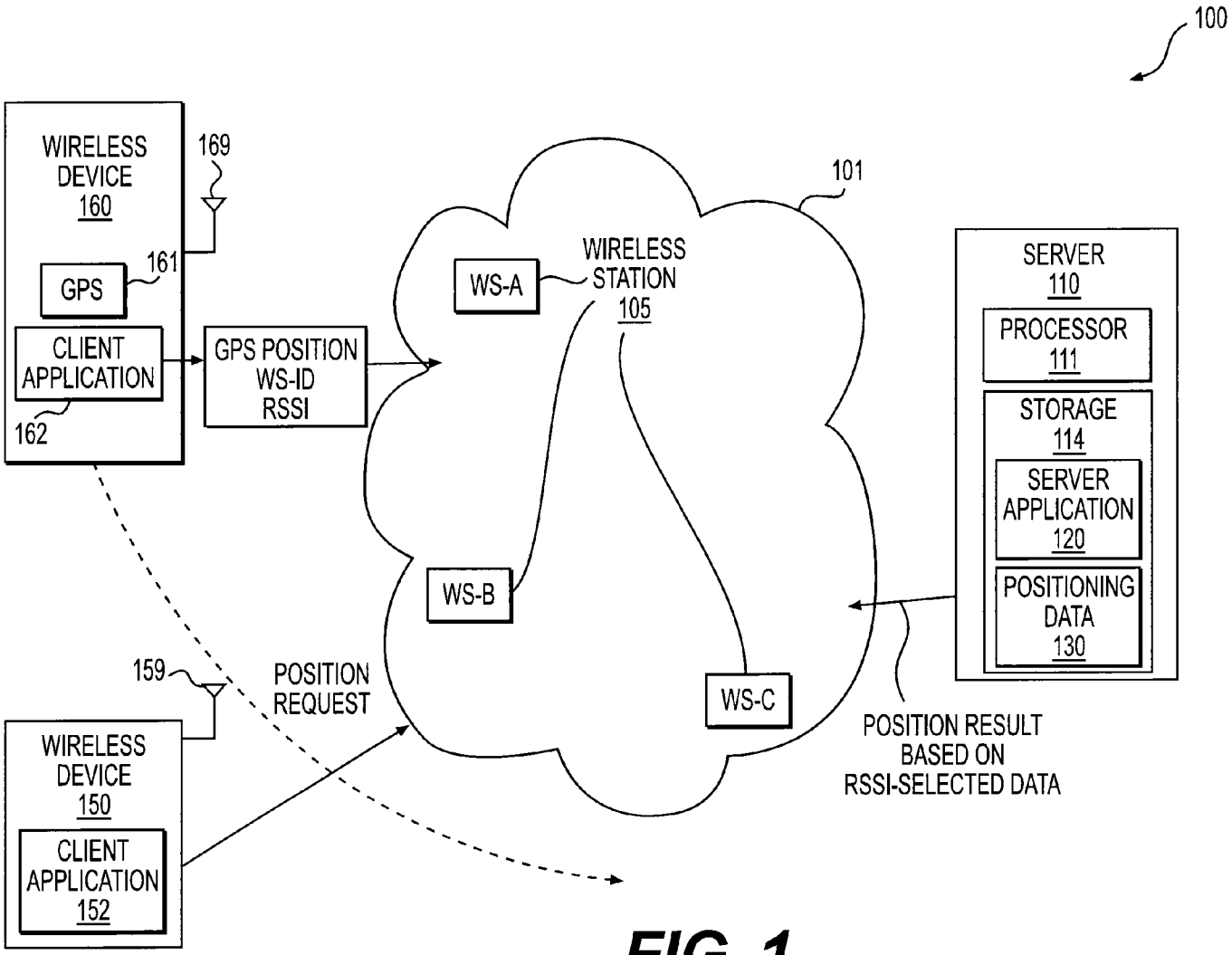
FIG. 1 shows a diagram of a positioning system example according to an embodiment of the disclosure.

FIG. 1 shows a diagram of a positioning system example 100 according to an embodiment of the disclosure. As illustrated, system 100 includes a plurality of components, each of which acts to provide specific functionality. These components include software which is stored in a storage and then executed on a processor to provide the functionality, hardware which is adapted to provide the component's functionality, or a combination of software and hardware which is working together to provide the component's functionality. The depicted geometry may be adapted to illustrate any one of the exemplary diagrams with reference to FIGS. 2 through 4, or any number of other processes within the scope of this disclosure.

The system 100 includes a network 101, a positioning server 110, and a plurality of wireless devices, such as wireless devices 150 and 160. The network 101 includes a plurality of wireless stations 105, such as wireless stations WS-A to WS-C, configured to communicate with the wireless devices via wireless signals. The positioning server 110 stores a database of previously obtained positioning data.

Each positioning data can associate position information of a location with fingerprints of wireless communication at the location. The fingerprints of wireless communication include an identifier of a wireless station that covers wireless communication at the location and a characteristic of a wireless signal received at the location. Further, the positioning server 110 can determine a position of a wireless device based on a subset of the positioning data that is selected according to fingerprints of wireless communication at the wireless device.

The network 101 includes a single network or a plurality of networks of the same or different types. In an example, the network 101 includes a fiber optic network in connection with a cellular network. Further, the network 101 can be a data network or a telecommunications or video distribution (e.g. cable, terrestrial broadcast, or satellite) network in connection with a data network. Any combination of telecommunications, video/audio distribution and data networks, whether a global, national, regional, wide-area, local area, or in-home network, can be used without departing from the spirit and scope of the disclosure.

According to an embodiment of the disclosure, the wireless stations 105 can be cellular base stations in a cellular network. Each wireless station 105 is configured according to various cellular technologies, such as global system for mobile (GSM), code division multiple access (CDMA), wideband code division multiple access (WCDMA), long term evolution (LTE) and the like to use radio frequency signals to communicate with the wireless devices. The cellular base station of a cellular network can broadcast a beacon signal providing an identifier (e.g., cell global identifier) for a plurality of wireless devices to connect to it when the wireless devices are within a communication range of the cellular base station. In turn, a plurality of cellular base stations may be available to a wireless device. As shown in FIG. 1 example, wireless device 160 can be connected to cellular base station WS-A, and cellular base station WS-A can be a serving base station for the wireless device 160. The serving base station WS-A can provide the wireless device 160 with telephony services and/or can relay the transmission, by providing communication access to a wide area network (WAN), such as the Internet, by use of a gateway, to the positioning server 110. While the wireless device 160 is wireless-connected to the serving base station WS-A, the wireless device 160 may receive beacon signals from neighboring base stations WS-B and WS-C.

According to another embodiment of the disclosure, the wireless stations 105 can be access points in a wireless local area network (LAN) or a wireless personal area network (PAN). Each wireless station 105 is configured according to various communication protocols, such as an Institute of Electrical and Electronics Engineers (IEEE) 802.11 based protocol (e.g., WiFi™ network) or an IEEE 802.15 based protocol (e.g., Bluetooth™ network), to use radio frequency signals to communicate with the wireless devices. The access point can broadcast a beacon signal providing an identifier (e.g., medium access control (MAC) address) for a plurality of wireless devices to connect to it when wireless devices are within a communication range of the access point. In turn, a plurality of access points can be available to a wireless device for connection. Those identifiers need not be associated with access points to which wireless device is connected or can connect. All identifiers of the access points retrieved by wireless device can be used in the position estimate. As shown in FIG. 1 example, wireless device 160 is located within a communication range of assess point WS-A in addition to access points WS-B and WS-C. Wireless device 160 can identify access points WS-A to WS-C under the wireless communication protocol used in a WiFi™ network. Access points WS-A to WS-C can be identified by MAC addresses of the access points. Access point WS-A can relay the transmission, by providing communication access to a WAN, such as the Internet, to the positioning server 110.

According to another embodiment of the disclosure, the wireless stations 105 include a first plurality of cellular base stations in a cellular network, and a second plurality of access points in a wireless LAN. As shown in FIG. 1 example, the wireless device 160 can be wireless-connected to cellular base station WS-A, and the cellular base station WS-A can be the serving base station for the wireless device 160. The serving base station WS-A can provide the wireless device 160 with telephony services and/or network (e.g., Internet) access. While the wireless device 160 is connected to serving base station WS-A, wireless device may receive beacon signals from access points WS-B and WS-C.

The wireless devices can be any type of mobile devices, such as laptop computer, tablet computer, smart phone, wearable electronic device, and the like that are configured to communicate with the wireless stations 105 using wireless signals. A wireless device can include hardware including, but not limited to, a processor and memory for executing and storing instructions, software including one or more applications and an operating system. The wireless device may have multiple processors and multiple shared or separate memory components. In an example, a wireless device is portable by a person. In an example, a wireless device is installable on a vehicle.

The positioning server 110 includes a plurality of components for position determination. As shown in FIG. 1 example, the positioning server 110 includes a processor 111 and a storage medium 114. In an example, the positioning server 110 can include more than one processors and storage media. In an example, the positioning server 110 is implemented using a distributed system that includes multiple processors, and/or multiple storage media coupled together by a network. The storage medium 114 stores positioning data 130. The positioning data can associate locations with wireless fingerprints, such as identifiers of the wireless stations 105 and wireless signal characteristics. In addition, the storage medium 114 stores various software instructions, such as a server application for positioning. In an example, the processor 111 executes the server application to provide positioning service.

According to an aspect of the disclosure, the wireless devices are installed with a client application for positioning. In an example, a wireless device with the client application installed provides positioning data to the positioning server 110. In another example, a wireless device with the client application requests positioning service from the positioning server 110.

In the FIG. 1 example, the wireless device 160 includes a plurality of components, such as an antenna 169, a receiving circuit (not shown), a transmitting circuit (not shown), a processor (not shown), and the like, to enable wireless communication with the wireless stations 105. In addition, the wireless device 160 is installed with a satellite positioning system, such as a global positioning system (GPS) 161, and a client application 162 for positioning. In an example, the GPS 161 includes a receiver (not shown) to receive signals from four or more satellites. The signals include transmission timing information and satellite location information. Based on the received signals, the GPS 161 calculates distances to the satellites. Then, the distances to the satellites and the satellite location information are used to determine the location of the wireless device 160. Position information of the location relates generally to geographic coordinates that include a latitude coordinate, a longitude coordinate, and an altitude coordinate of wireless device 160. In an example, position information of the location is represented as a pair of a latitude coordinate and a longitude coordinate.

The client application 162 enables the wireless device 160 to communicate with the positioning server 110. In an embodiment, a user of the wireless device 160 turns on the GPS 161 to allow the wireless device 160 to provide direction information on the trip. When the GPS 161 is turned on, the client application 162 requests a permission by the user, for example via a user interface, to provide positioning data to the positioning server 110.

When the user permits the request via the user interface, the client application 162 provides information to form positioning data in the positioning server 110. In an example, at a location, the client application 162 obtains position information (e.g., latitude and longitude) from the GPS 161. Further, the client application 162 obtains fingerprints of wireless communication at the location, such as identifiers of wireless stations 105 that is in wireless communication with the wireless device 160 and characteristics of wireless signals at the location. In an example, the client application 162 obtains a received signal strength indicator (RSSI) as characteristic of a wireless signal received at the location. Further, the client application 162 prepares a message to the positioning server 110 according to a network communication protocol (e.g., software for implementing communication protocol, such as the Transmission Control Protocol/Internet Protocol (TCP/IP), Hypertext Transfer Protocol (HTTP), etc.). The message carries information to form a positioning data, such as the position information, an identifier of a wireless station and a characteristic of a wireless signal received at the location from the wireless station. Then, the wireless device 160 sends a wireless signal corresponding to the message to the wireless station and the wireless station forwards the message to the positioning server 110 via the network 101. When the user with the wireless device 160 moves on the trip, at different locations, the wireless device 160 have different wireless fingerprints, such as in communication with different wireless stations, having different values of RSSI, and the like. The wireless device 160 can provide position information associated with wireless fingerprints at the different locations on the trip to the positioning server 110. In an example, when the positioning server 110 receives a message carrying information to form a positioning data, the positioning server 110 retrieves from the message the position information and the associated wireless fingerprints, such as an identifier of a wireless station and a value of RSSI, forms a positioning data that can associate position information with wireless fingerprints, and stores the positioning data in the storage medium 114.

According to an aspect of the disclosure, various wireless devices are similarly configured as the wireless device 160 to send messages carrying information to form positioning data from different locations. The positioning server 110 receives the messages, form positioning data and stores the positioning data in the storage medium 114. The positioning data are stored in a positioning database. Based on the positioning database, the positioning server 110 provides positioning service to another wireless device, such as the wireless device 150. In the FIG. 1 example, the wireless device 150 includes a plurality of components, such as an antenna 159, a receiving circuit (not shown), a transmitting circuit (not shown), a processor (not shown), and the like, to enable wireless communication with the wireless stations 105. In addition, the wireless device 150 is installed with a client application 152 for positioning. In an example, the wireless device 150 does not have a GPS, but has a need of knowing its position.

According to an aspect of the disclosure, at a position when a user of the wireless device 150 want to know the position, the user instructs the client application 152 via a user interface. Then, the client application 152 causes the wireless device 150 to send a message according to a network communication protocol to the positioning server 110. The message carries a position request. The wireless device 150 can provide wireless fingerprints, such as an identifier of a wireless station in communication with the wireless device 150, a value of RSSI for a wireless signal received at the location, and the like, to the positioning server 110 in the same message or in a different message. In an embodiment, when the positioning server 110 receives the position request from the wireless device 150, the positioning server 110 identifies the wireless station that is in communication with the wireless device 150. The positioning server 110 retrieves a group of positioning data associated with the wireless station. Further, the positioning server 110 selects a subset in a group of the positioning data for the wireless station that has similar signal characteristic (e.g., RSSI value in a same range) as the wireless device 150 at its location. Then, the positioning server 110 determines a position of the wireless device 150 based on the selected subset in the group of positioning data. The position information is represented as a pair of a latitude coordinate and a longitude coordinate. In an example, the positioning server 110 calculates an average, or a weighted average of locations as a position result from the subset in the group of positioning data. In the example, the positioning server 110 sends a responding message carrying the position result to the wireless device 150 according to a network communication protocol.

According to an aspect of the disclosure, the positioning data associated with a wireless station are clustered into subsets according to signal characteristics, such as RSSI values. In an example, RSSI values are ranged from 0 to 100. The positioning data are clustered into a first subset with RSSI values from 0 to 33, a second subset with RSSI values from 34 to 66, and a third subset with RSSI values from 67 to 100. In another example, a maximum RSSI in the group is 90, and a minimum RSSI in the group is 10. The positioning data are clustered into a first subset with RSSI values from 10 to 30, a second subset with RSSI values from 31 to 50, a third subset with RSSI values from 51 to 70, and a fourth subset with RSSI values from 71 to 90. In another example, the positioning data are clustered into multiple subsets according to the RSSI values to have relatively uniform population of positioning data in each subset.

Figure 2:
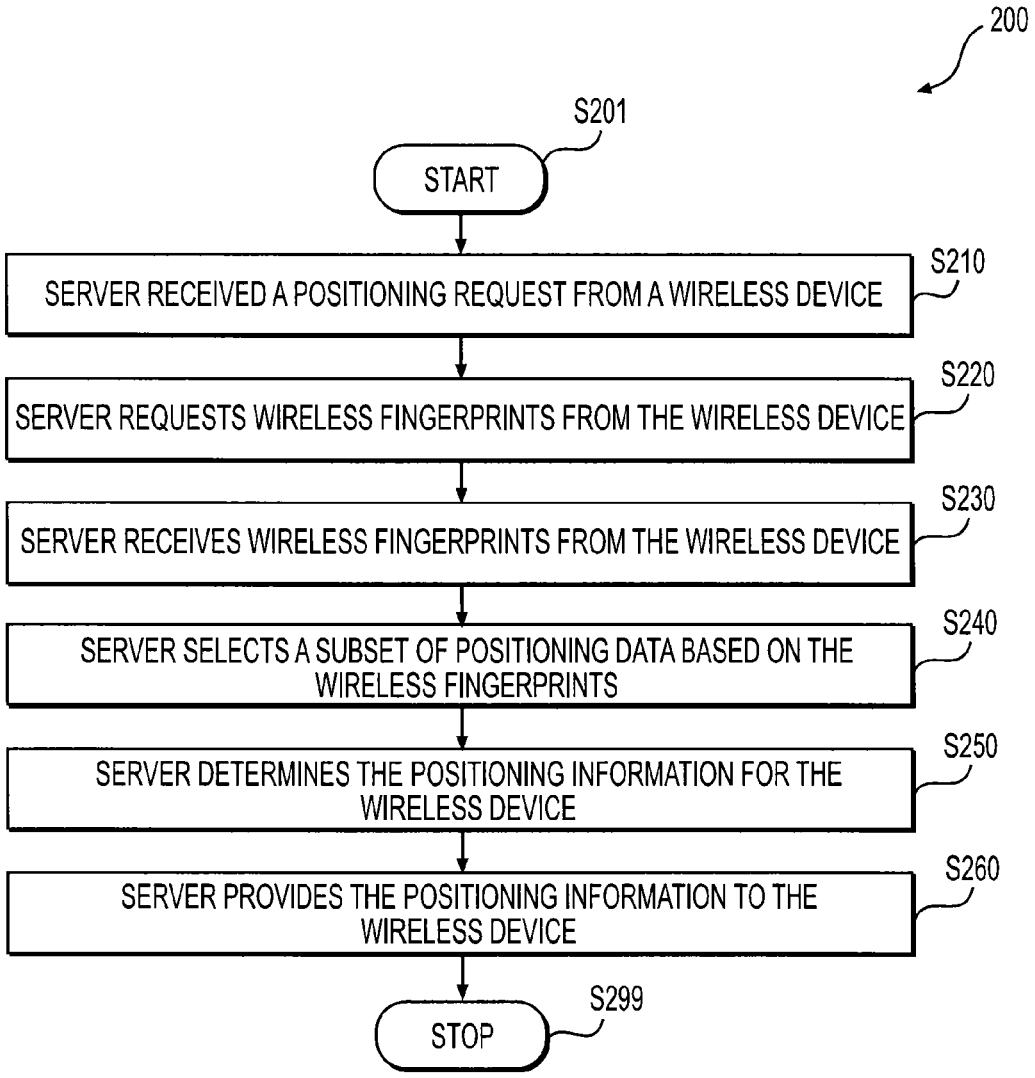
FIG. 2 shows a flowchart outlining a process example for positioning according to an embodiment of the disclosure.

FIG. 2 shows a flowchart outlining a process example 200 for positioning according to an embodiment of the disclosure. The process 200 will be described in reference to the positioning system 100 and is executed in the positioning system 100. The process starts at S201 and proceeds to S210.

At S210, a server receives a position request from a wireless device. In the FIG. 1 example, a user instructs the wireless device 150 for current position via a user interface. The client application 152 sends a message carrying a position request to the positioning server 110 according to a network communication protocol via the network 101. Specifically, the wireless device 150 transmits a wireless signal corresponding to the message to a wireless station 105. The wireless station 105 processes the wireless signal to obtain the message, and forwards the message to the positioning server 110. The message includes wireless fingerprints. In an example, the wireless device 150 communicates with an access point in a wireless LAN, the wireless device 150 includes a media access control (MAC) address of the access point in the message. In another example, the wireless device 150 communicates with a cellular base station in a cellular network, the wireless device 150 includes cell global identifier of the cellular base station in the message. The cell global identifier includes a mobile country code (MCC), a mobile network code (MNC), a local area code (LAC), and a cell identifier (Ci).

At S220, the server requests wireless fingerprints from the wireless device. In an example, the positioning server 110 determines a positioning method based on information in the received message. In an example, when the information in the received message indicates a cellular network, the positioning server 110 determines to use a first method optimized for positioning in the cellular network; and when the information in the received message indicates a wireless LAN, the positioning server 110 determines to use a second method optimized for positioning in the wireless LAN. In an example, the positioning server 110 can include other positioning methods, such as a third method for a hybrid wireless network, a fourth method using LAC to determine position. Then, the positioning server 110 sends a message to the wireless device 150 to inform the determined method, and to request wireless fingerprints according to the determined method.

At S230, the server receives wireless fingerprints from the wireless device. In an embodiment, when the wireless device 150 receives a message from the positioning server 110 informing the method, the wireless device 150 provides wireless fingerprints to the positioning server 110 through a network communication protocol. In an example, when the message informs the first method, the wireless device 150 provides an identifier (i.e., a MCC, MNC, LAN and Ci) of a cellular base station in communication with the wireless device 150 and a RSSI value of wireless signal received by the wireless device 150 from the cellular base station, to the positioning server 110. When the message informs the second method, the wireless device 150 provides a MCC, an MAC address of an access point in communication with the wireless device 150, and a RSSI value of wireless signal received by the wireless station 150 from the access point, to the positioning server 110. When the message informs the third method, the wireless device 150 provides cumulated information in the first method and the second method to the positioning server 110. When the message informs the fourth method, the wireless device 150 does not need to provide information.

At S240, the server selects a subset of positioning data based on the wireless fingerprints. In an example, the positioning server 110 identifies the wireless station using the identifier to retrieve a group of positioning data from a database. The group is clustered into a plurality of subsets according to boundaries of RSSI values. The boundaries can be fixed boundaries or can be dynamically adjustable. In an example, the boundaries are fixed boundaries that divide the space of the RSSI values. In another example, the boundaries are dynamically adjusted to maintain relatively uniform populations across the subsets. If the received RSSI value is inside the boundaries of a group of positioning data, a subset in the group of positioning data can be selected when the received RSSI value is inside the boundaries of the subset. If the received RSSI value is outside the boundaries of a group of positioning data, a subset is determined based on calculating the closeness between the received RSSI value and the RSSI values in the group of positioning data.

At S250, the server determines position information of the wireless device based on the selected subset of positioning data. The position information includes the determined position of the wireless device and the estimated uncertainty value associated with the determined position. In an example, the positioning server 110 determines if the received RSSI value is inside the boundaries of a group of positioning data, the position of the wireless device based on weigh-averaging position information in the selected subset of positioning data when the received RSSI value is inside the boundaries of a subset. In another example, the positioning server 110 determines if the received RSSI value is outside the boundaries of a group of positioning data, the position of the wireless device based on averaging position information in the determined subset of positioning data. Based on the determined position of the wireless device, the positioning server 110 calculates an uncertainty value associated with the determined position.

At S260, the server provides the position information to the wireless device. The positioning server 110 sends a message according to a network communication protocol to the wireless device 150. The message carries the determined position information for the wireless device 150. When the wireless device 150 receives wireless signal corresponding to the message from the wireless station, the wireless device 150 processes the wireless signal to obtain the position information, the client application 152 provides the position information to the user via the user interface. The wireless device 150 can optionally display the position information as a circle on a map. The center of a circle can be the determined position of the wireless device. The estimated uncertainty value associated with the determined position can be represented as radius of a circle. The center of the circle does not coincide with the physical geographic position of the wireless device that is within an area encompassed by a circle. The process proceeds to S299 and terminates.

One skilled in the art would recognize that the flowchart of FIG. 2 may be used to determine the position information when the wireless device 150 is at a location in coverage overlapping area of multiple wireless stations. In a wireless LAN example, a wireless device 150 at particular place (e.g., an airport) may frequency-scan to retrieve wireless fingerprints from a plurality of wireless stations (e.g., at least one to twenty access points) within a communication range of the wireless device. Wireless device 105 may be capable of connecting to fewer access points than are within range (due to, for example, security setting of the access points and wireless device). Wireless device 105 may be actively connected to one or multiple access points, or no access points at all. Regardless of whether the wireless device 105 is connected to the access point, all identifiers of the access points retrieved by wireless device can be used in position determination.

At S210, the positioning server 110 can receive a position request from a wireless device 150. At S230, the positioning server 110 can receive n identifiers (n is a positive integer) and n RSSI values from n wireless stations. At S240, the positioning server 110 can identify the n wireless stations using the n identifiers to retrieve the n groups of positioning data from a database. After that, the positioning server 110 can select the n subsets in the n groups of positioning data using the n RSSI values. At S250, the positioning server 110 can calculate the n locations using the n selected subsets of positioning data, exclude outliers from the n locations, and determine position information of the wireless device based on averaging the n locations at the most.

The positioning server 110 can apply a bounding box process to exclude outliers from a set of the n locations. In an example, the bounding box can be determined by extreme points (e.g., easternmost, westernmost, northernmost, and southernmost points) as a rectangular area that contains a location as a center of the rectangular area. The location is determined by averaging a set of the n locations. The extreme points within the boundaries of the bounding box are determined using a set of the n locations. For example, the bounding box can have a northern and a southern boundary respectively that is delineated by the latitude coordinate of the average location within which a 95 percent (e.g., 95 percent to reflect a confidence of estimate) of latitude coordinate of the n locations are encompassed. The bounding box can have an eastern and a western boundary respectively that is delineated by the longitude coordinate of the average location within which a 95 percent of longitude coordinate of the n locations are encompassed. Defining a threshold to be a length that corresponds to the longest distance between two extreme points in the bounding box. The positioning server 110 calculates a distance between the average location and each location in the set and identifies outliers if outliers whose distances to the average location exceed a threshold can be excluded from the set. Outliers can be locations in the set that are located farthest from the average location. The n locations may be excluded one or more locations, or no locations at all.

After the positioning server 110 has excluded outliers from a set of the n locations, it determines position information of the wireless device based on averaging the n locations at the most and calculates an estimated uncertainty value associated with the determined position. At S260, the positioning server 110 provides the position information to the wireless device 105.

FIG. 3 shows an example for positioning data according to an embodiment of the disclosure. The positioning data are stored in the format of a table 330. The table 330 includes a first field 332 for location and a second field 336 for wireless fingerprints. In the FIG. 3 example, the location is represented as a pair of a latitude coordinate and a longitude coordinate, and the wireless fingerprints are represented as an identifier of a wireless station and a RSSI value received from the wireless station at the location.

For example, at a first location (LOCATION 1), a wireless device can receive a wireless signal from the wireless station WS-A. Then, in a positioning data, the first field stores latitude (LAT-1) and longitude (LON-1) for the first location, and the second field stores the fingerprints of a wireless signal that includes an identifier of the wireless station WS-A and a RSSI value (e.g., 50) received from the wireless station WS-A at the first location. In an example, a wireless device may receive wireless signals from more than one wireless station. For example, at a third location (LOCATION 3), a wireless device can receive wireless signals from both the wireless station WS-A and the wireless station WS-B. Then, in a positioning data, the first field stores latitude (LAT-3) and longitude (LON-3) for the third location, and the second field stores the fingerprints of the wireless signals that includes the identifier of the wireless station WS-A in association with a RSSI value (e.g., 40) received from the wireless station WS-A at the third location, and the identifier of the wireless station WS-B in association with a RSSI value (e.g., 20) received from the wireless station WS-B at the third location.

In an embodiment of the disclosure, the positioning data can be stored in a database of any suitable format. In an example, the positioning data are stored in a format to facilitate extracting a group of data for a wireless station and to facilitate extracting a subset of data of a specific signal characteristic. A group of positioning data for a wireless station is clustered into subsets according to clustering boundaries stored in a wireless station information table.

In an example, the first wireless station information table is for a cellular network that includes 23 fields for each entry to store clustering information. Each entry in the first wireless station information table corresponds to clustering information for a group of positioning data associated with a cellular base station in the cellular network. The group of positioning data is clustered into three subsets according to RSSI values. The 23 fields are (1) an identification of the cellular technology type (Id), (2) mobile country code (MCC), (3) mobile network code (MNC), (4) local area code (LAC), (5) cell identifier (Ci), (6) latitude of the cellular base station (Lat), (7) longitude of the cellular base station (Lon), (8) uncertainty errors for the group of positioning data (Uncert Error), (9) the total number of data in the group of positioning data (Data Num), (10) uncertainty errors for the first subset of positioning data (Uncert1), (11) the number of data in the first subset of positioning data (Data Num1), (12) uncertainty errors for the second subset of positioning data (Uncert2), (13) the number of data in the second subset of positioning data (Data Num2) (14) uncertainty errors for the third subset of positioning data (Uncert3), (15) the number of data in the third subset of positioning data (Data Num3), (16) coverage range (Cover Range), (17) RSSI threshold (RSSI Thrshld), (18) a first RSSI boundary value (RSSI), (19) a second RSSI boundary value (RSS2), (20) a third RSSI boundary value (RSS3), (21) a fourth RSSI boundary value (RSS4), (22) the most recent inquiry time (Inquiry Time) and (23) the most recent update time (Update Time). In the example, the first subset of positioning data for the group have RSSI values between the first RSSI boundary value and the second RSSI boundary value; the second subset of positioning data for the group have RSSI values between the second RSSI boundary value and the third RSSI boundary value; the third subset of positioning data for the group have RSSI values between the third RSSI boundary value and the fourth RSSI boundary value; and a group of positioning data has RSSI values between the first RSSI boundary and the fourth RSSI boundary value.

In another example, the second wireless station information table is for a wireless LAN that includes 18 fields for each entry to store clustering information. Each entry in the second wireless station information table corresponds to clustering information for a group of positioning data associated with an access point in the wireless LAN. The group of positioning data is clustered into two subsets according to RSSI values. The 18 fields are (1) an identification of wireless LAN type (Id), (2) mobile country code (MCC), (3) media access control address (MAC), (4) latitude of the access point (Lat), (5) longitude of the access point (Lon), (6) uncertainty errors for the group of positioning data (Uncert Error), (7) the total number of data in the group of positioning data (Data Num), (8) uncertainty errors for the first subset of positioning data (Uncert1), (9) the number of data in the first subset of positioning data (Data Num1), (10) uncertainty errors for the second subset of positioning data (Uncert2), (11) the number of data in the second subset of positioning data (Data Num2), (12) coverage range (Cover Range), (13) RSSI threshold (RSSI Thrshld), (14) a first RSSI boundary value (RSS1), (15) a second RSSI boundary value (RSS2), (16) a third RSSI boundary value (RSS3), (17) the most recent inquiry time (Inquiry Time) and (18) the most recent update time (Update Time). In the example, the first subset of positioning data for the group have RSSI values between the first RSSI boundary value and the second RSSI boundary value; the second subset of positioning data for the group have RSSI values between the second RSSI boundary value and the third RSSI boundary value; and a group of positioning data has RSSI values between the first RSSI boundary and the third RSSI boundary value.

According to an aspect of the disclosure, the database of positioning data is updated frequently, such as in real-time, or at a particular time, or during a particular time period, or daily. The population distribution of the positioning data may vary. In an embodiment, a positioning server, such as the positioning server 110, is configured to dynamically adjust the clustering boundaries to maintain relatively uniform population across the subsets.

Figure 4:
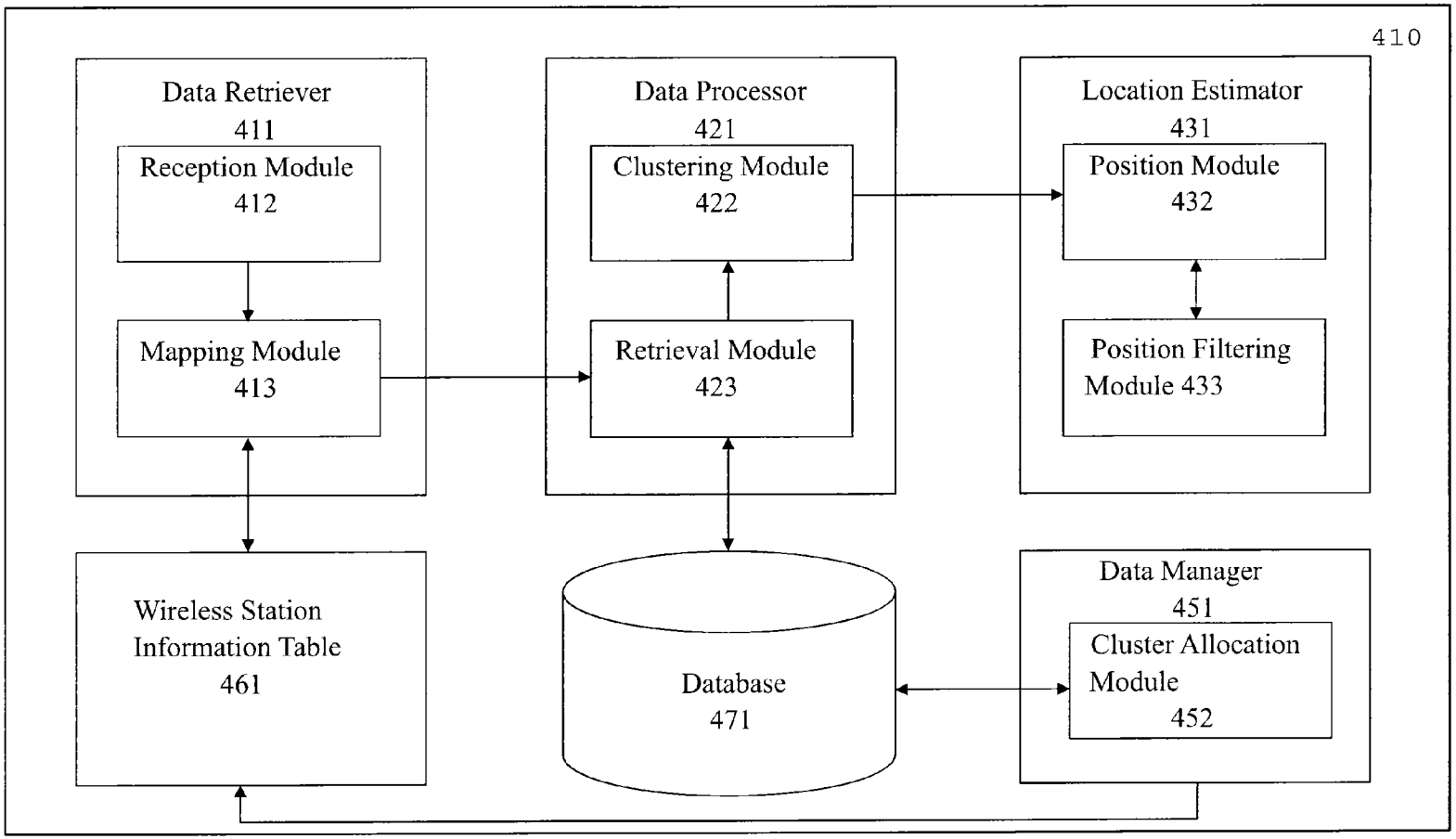
FIG. 4 shows a block diagram of a server example according to an embodiment of the disclosure.

FIG. 4 shows a block diagram of a positioning server example 410 according to an embodiment of the disclosure. As illustrated, server 410 includes a plurality of elements, each of which acts to provide specific functionality. These elements include software which is stored in a memory and then executed on a processor to provide the functionality, hardware which is adapted to provide the element's functionality, or a combination of software and hardware which is working together to provide the element's functionality.

The positioning server 410 is configured to dynamically adjust the clustering boundaries to perform cluster allocation. The positioning server 410 includes a data retriever 411, a data processor 421, a location estimator 431, a data manager 451, a wireless station information table 461, and a database 471. These elements are coupled together as shown in FIG. 4.

The database 471 stores previously obtained positioning data. In an example, each positioning data stores position information (e.g., latitude and longitude) for a location in association with wireless fingerprints (e.g., an identifier of a wireless station, and a RSSI value received from the wireless station) at the location. The database 471 can be organized under a hierarchical folder structure, the folders mapping to directories in the file system.

The data manager 451 includes a cluster allocation module 452 that is configured to dynamically adjust clustering boundaries of subsets in each group. In an embodiment, the cluster allocation module 452 dynamically adjusts the clustering boundaries such that the subsets of the group have relatively uniform population. In an example, the cluster allocation module 452 determines a value of a cumulative distribution function (CDF) for each subset. The CDF is calculated based on the population distribution in each subset. When the CDF for the subsets reaches below a threshold value, the subsets are configured to possibly have uniform population, and when the CDF for one or more subsets reaches over a threshold value, the cluster allocation module 452 using suitable algorithms determines the RSSI boundary values to achieve relatively uniform population across the subsets for the group, and updates RSSI boundary values in an entry for the group in a wireless station information table 461. The wireless station information table 461 includes the first wireless station information table that is for a cellular network. The wireless station information table 461 further includes the second wireless station information table that is for a wireless LAN.

During operation, in an embodiment, the data retriever 411 includes a reception module 412 that is configured to receive position request message from wireless device through wireless station. The wireless device is in communication with a wireless station in a network to send the message according to a network communication protocol to direct the message to the positioning server 410. The reception module 412 processes the message and extracts wireless fingerprint information, such as an identifier of the wireless station, a signal characteristic (e.g., a RSSI value of received by the wireless device from the wireless station), and the like from the message.

The data retriever 411 further includes a mapping module 413 that is configured to receive the wireless fingerprint information from reception module 412. The mapping module 413 uses the wireless fingerprints (i.e., an identifier of the wireless station) as index to search the wireless station information table 461 for clustering information of a group of positioning data for the wireless station. In a cellular network example, MCC, MNC, LAC, and Ci can be regarded as index to search the first wireless station information table for clustering information of a group of positioning data for the wireless station. In a wireless LAN example, MCC and MAC can be regarded as index to search the second wireless station information table for clustering information of a group of positioning data for the wireless station. After the mapping module 413 has retrieved the clustering information of a group of positioning data for the wireless station, it relays information to a data processor 421.

The data processor 421 includes a retrieval module 423 that is configured to receive the clustering information of a group of positioning data for the identified wireless station. This set of information allows the retrieval module 423 to extract the group of positioning data from the database 471. The retrieval module 423 may include a memory that stores the group of position data. The retrieval module 423 provides an interface through which a database 471 can provide the group of position data for the identified wireless station.

The data processor 421 further includes a clustering module 422 that is configured to receive the clustering information of a group of positioning data for the identified wireless station, the group of positioning data, and the wireless fingerprint information. A group of positioning data for a wireless station can be clustered into subsets according to clustering boundaries. Each subset includes one or more positioning data. The clustering module 422 can select a subset in the group of positioning data based on the wireless fingerprints (i.e., a RSSI value). If the received RSSI value is inside the boundaries of a group of positioning data, a subset in the group of positioning data is selected when the received RSSI value is inside the boundaries of the subset. If the received RSSI value is outside the boundaries of a group of positioning data, a subset can be determined based on calculating the closeness between the received RSSI value and the RSSI values in the group of positioning data. The closeness can be calculated by exponential decay model. In an example, the determined subset can be a subset with the most similar signal characteristics as the received signal characteristic, and includes at least one or more positioning data. After the clustering module 422 has selected a subset of positioning data for the identified wireless station, it relays information to the location estimator 431.

The location estimator 431 includes a position module 432 that is configured to use the selected subset of positioning data to determine the position of the wireless device. The position module 432 can use suitable algorithms to estimate the position of the wireless device. In an example, when the received RSSI value is inside the boundaries of a group of positioning data, the position module 432 can calculate the position of the wireless device using the previously obtained locations in the selected subset of positioning data. The position determination includes assigning a weight to each of the locations and averaging the weighted locations to determine a position of the wireless device. Assigning a weight to each of the locations can include assigning a weight to each of the latitudes and the longitudes of the locations. The weight of a location can be determined by a received RSSI value to the RSSI values in the selected subset of positioning data. Calculating the average location can include calculating an average of weighted latitudes and an average of weighted longitudes of locations, and designating a position at the calculated average latitude and the calculated average longitude as the position result for the wireless device. In another example, when the received RSSI value is outside the boundaries of a group of positioning data, the position module 432 can calculate the position of the wireless device using the previously obtained locations in the determined subset of positioning data. The position determination includes calculating the average location that can include calculating an average of latitudes and an average of longitudes of locations, and designating a position at the calculated average latitude and longitude as the position result for the wireless device.

After the position module 432 has determined the position of the wireless device, it calculates an estimated uncertainty value associated with the determined position by applying circular error probable (CEP) theory to calculate 95% radius of the determined position. A 95 percent reflects a confidence of estimate. The estimated uncertainty value can differ from a position to a position, based on the population distribution pattern of the locations (e.g., number of the locations, density of the locations, and location concentration area) in the selected subset of positioning data. In an example, an estimated uncertainty value can be sufficiently small where the locations are highly concentrated.

One skilled in the art would recognize that the block diagram of FIG. 4 may be used to determine the position information when the wireless device is at a location in coverage overlapping area of multiple wireless stations. In a wireless LAN example, a wireless device at particular place (e.g., an airport) may frequency-scan to retrieve wireless fingerprints from a plurality of wireless stations (e.g., at least one to twenty access points) within a communication range of the wireless device. Regardless of whether the wireless device is connected to the access point, all identifiers of the access points retrieved by wireless device can be used in position determination. The positioning server 410 can receive a position request from a wireless device. The reception module 412 can receive n identifiers (n is a positive number) and n RSSI values from n wireless stations. The mapping module 413 can identify the n wireless stations using the n identifiers to retrieve the n clustering information of the group of positioning data from wireless station information table 461. The retrieval module 423 extracts the n groups of positioning data from a database 471 using the n clustering information. The clustering module 422 can select the n subsets in the n groups of positioning data using the n RSSI values. The position module 432 can calculate the n locations using the n selected subsets of positioning data.

Then, the location estimator 431 further includes a position filtering module 433 that is configured to exclude outliers from the n locations provided by the position module 432. A bounding box process can be used to exclude outliers from a set of the n locations. The bounding box can be a rectangular area that is determined by extreme points (e.g., easternmost, westernmost, northernmost, and southernmost points). The bounding box contains a location as a center of the rectangular area. The location can be determined by averaging the n locations in the set. Defining a threshold to be a length that corresponds to the longest distance between two extreme points in the bounding box. The position filtering module 433 can calculate a distance between the average location and each location in the set and identify outliers if outliers whose distances to the average location exceed a threshold can be excluded from the set. The n locations may be excluded one or more locations, or no locations at all. Outliers can be locations in the set that are located farthest from the average location.

After the position filtering module 433 has excluded outliers from the n locations provided by the position module 432, it relays the n locations at the most to the position module 432. The position module 432 determines position information of the wireless device based on averaging the n locations at the most, and calculates an estimated uncertainty value associated with the determined position.

The positioning server 410 sends the position result to the wireless device. In an example, the positioning server 410 outputs a message to the wireless device according to a network communication protocol. The message carries the position result.

The features as described in reference to FIGS. 1-4 can be implemented in one or more computer programs that are performed by a processing system, including at least one programmable processor coupled to received data and instructions from, and to transmit data and instructions, to a data storage system, at least one input device, and at least one output device. A computer program is sets of instructions that can be used, directly or indirectly, in a computer to perform a certain activity or bring about a certain result. A computer program can be written in any form of programming language (e.g., Java, Objective-C), including compiled or interpreted languages, and can be deployed in any form, including as a stand-alone program or as a module, component, a browser-based web application, or other unit suitable for use in a computing environment.

The features can be performed in a computer system that can include a back-end component (e.g., a data server), or that can include a middleware component (e.g., an application server), or that can include a front-end component (e.g., a computer having a graphical user interface or an Internet browser, or any combination of them). The components of the system can be connected by any form or medium of data communication networks. In some implementations, communication networks can include a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:

providing a database of positioning data, each positioning data associating position information of a location with an identifier of a wireless station for providing wireless connection at the location and a strength of a signal received at the location;

receiving a position request from a wireless device that receives an identifier and a signal strength from a specific wireless station;

identifying the specific wireless station using the identifier to retrieve a group of positioning data from the database;

selecting a subset in the group of positioning data using the received signal strength;

determining position information of the wireless device using the selected subset of positioning data; and calculating an estimated uncertainty value associated with the determined position information of the wireless device using circular error probable (CEP) theory to calculate a threshold percentage of radius of the determined position information of the wireless device.

2. The method of claim 1, wherein the selecting the subset in the group of positioning data further comprises:

selecting, when the received signal strength is inside [the] boundaries of a group of positioning data, the subset when the received signal strength is inside the boundaries of the subset.

3. The method of claim 2, further comprising:

determining the subset when the received signal strength is outside the boundaries of a group of positioning data.

4. The method of claim 3, wherein the determining the subset is based on calculating a closeness between the received signal strength and each signal strength in the group of positioning data.

5. The method of claim 4, wherein the calculating the closeness is based on exponential decay model.

6. The method of claim 1, wherein the determining position information of the wireless device further comprises:

weigh-averaging position information in the selected subset of positioning data when the received signal strength is inside [the] boundaries of a group of positioning data.

7. The method of claim 6, further comprising:

averaging position information in the selected subset of positioning data when the received signal strength is outside the boundaries of a group of positioning data.

8. The method of claim 6, wherein the calculated threshold percentage of radius is 95% radius of the determined position information of the wireless device.

9. The method of claim 6, wherein a weight of a position is determined based on the received signal strength to each signal strength in the selected subset of positioning data.

10. An apparatus, comprising:

a storage medium configured to provide a database of positioning data, each positioning data associating position information of a location with an identification of a wireless station [device] for providing wireless connection at the location and [the] strength of a signal received at the location; and a processor configured to:

receive a position request from a wireless device that receives an [identifiers] *identifier* and the strength of a signal from a specific wireless station;

identify the specific wireless station using the identifier to retrieve a group of positioning data from a database;

select a subset in the group of positioning data using the received signal strength;

determine position information of the wireless device using the selected subset of positioning data; and calculate an estimated uncertainty value associated with the determined position information of the wireless device using circular error probable (CEP) theory to calculate a threshold percentage of radius of the determined position information of the wireless device.

11. The apparatus of claim 10, wherein the processor selects the subset in the group of positioning data further comprises:

select when the received signal strength is inside the boundaries of a group of positioning data, the subset when the received signal strength is inside [the] boundaries of the subset.

12. The apparatus of claim 11, *wherein the processor configured to select the subset in the group of positioning data* further [comprising] *comprising*: determine the subset when the received signal strength is outside the boundaries of [a] *the* group of positioning data.

13. The apparatus of claim 12, wherein the processor determines the subset is based on calculating [the] *a* closeness between the received signal strength and each signal strength in the group of positioning data.

14. The apparatus of claim [12] *13*, wherein the processor calculates [the] *a* closeness is based on exponential decay model.

15. The apparatus of claim 10, wherein the processor determines position information of the wireless device further comprises:

weigh-average position information in the selected subset of positioning data when the received signal strength is inside [the] boundaries of a group of positioning data.

16. The apparatus of claim 15, *wherein the processor configured to determine position information of the wireless device* further [comprising] *comprises*:

average position information in the selected subset of positioning data when the received signal strength is outside the boundaries of [a] *the* group of positioning data.

17. The apparatus of claim 15, wherein the calculated threshold percentage of radius is 95% radius of the determined position information of the wireless device.

18. The apparatus of claim 15, wherein the processor determines a weight of a position based on the received signal strength to each signal strength in the selected subset of positioning data.

19. An apparatus, comprising:

a data retriever that comprises a reception module configured to receive [the] identifiers and [the strength of] signals from wireless stations, and a mapping module configured to identify *the* wireless stations using the identifiers;

a data processor that comprises a retrieval module configured to extract [the] groups of positioning data from a database, and a clustering module configured to select [the] subsets in the groups of positioning data using [the] strength of *the* received signals;

a location estimator that comprises a position module configured to determine position information of [the] *a* wireless device using the selected subsets [of] *in the*

*groups of* positioning data, calculate an estimated uncertainty value associated with the determined position information of the wireless device using *a* circular error probable (CEP) theory to calculate a threshold percentage of *a* radius of the determined position information of the wireless device, and a position filtering module configured to exclude outliers when [outliers whose] distances *of the outliers* exceed a threshold; and a data manager that comprises a cluster allocation module configured to reset clustering boundaries of a subset when a requirement is satisfied.

* * * * *